(12) United States Patent
Wang

(10) Patent No.: US 6,371,544 B1
(45) Date of Patent: Apr. 16, 2002

(54) WORKPIECE TRANSFER DEVICE FOR A FORGING MACHINE

(75) Inventor: Sheng-Yau Wang, Tainan Hsien (TW)

(73) Assignee: San Shing Hardware Works Co., Ltd., Tainan Hsien (TW)

( * ) Notice: Subject to any disclaimer, the term of this patent is extended or adjusted under 35 U.S.C. 154(b) by 0 days.

(21) Appl. No.: 09/537,737

(22) Filed: Mar. 29, 2000

(51) Int. Cl.[7] .......................... B21D 43/10; B65G 47/90
(52) U.S. Cl. ..................... 294/87.1; 72/405.12; 294/88; 294/115; 414/753.1
(58) Field of Search ........................ 294/87.1, 88, 106, 294/115, 116; 72/361, 405.01, 405.09, 405.12, 422; 198/468.2; 414/626, 739, 751.1, 753.1; 470/89, 95, 137, 139, 177

(56) References Cited

U.S. PATENT DOCUMENTS

| | | | | |
|---|---|---|---|---|
| 3,154,801 A | * | 11/1964 | Byam | 72/361 X |
| 3,165,766 A | * | 1/1965 | Wisebaker | 470/177 X |
| 3,610,676 A | * | 10/1971 | Richner | 294/116 |
| 3,633,766 A | * | 1/1972 | Byam et al. | 72/422 X |
| 3,685,070 A | * | 8/1972 | McClellan et al. | 72/405.09 X |
| 3,717,890 A | * | 2/1973 | Weller | 72/405.12 X |
| 4,473,147 A | * | 9/1984 | Bouwman | 294/87.1 X |
| 4,985,981 A | * | 1/1991 | Wang | 470/95 X |

* cited by examiner

Primary Examiner—Johnny D. Cherry
(74) Attorney, Agent, or Firm—Merchant & Gould P.C.

(57) ABSTRACT

A workpiece transfer device includes an elongated hollow housing, a plurality of push mechanisms, a plurality of coupling devices, a plurality of lever mechanisms, and an elongated swing member. The push mechanisms have a plurality of spindles disposed inside and spaced longitudinally of the housing. Each of the coupling devices has a cylindrical sleeve member sleeved rotatably on a corresponding one of the spindles, and at least one cantilever extending radially from the sleeve member for turning about the corresponding one of the spindles. Each of the cantilevers has a distal end distal from the corresponding one of the spindles. Each of the lever mechanisms has a lever connected pivotally to a corresponding one of the cantilevers. Each of the levers has a first end portion engaging the corresponding one of the spindles, and a second end portion adjacent to the distal end of the corresponding one of the cantilevers. The elongated swing member is connected pivotally to the distal end of each of the cantilevers to swing in a swing direction that is parallel to a length of the housing.

8 Claims, 18 Drawing Sheets

WORKPIECE TRANSFER DEVICE FOR A FORGING MACHINE

BACKGROUND OF THE INVENTION

1. Field of the Invention

This invention relates to a workpiece transfer device, more particularly to a workpiece transfer device for a forging machine.

2. Description of the Related Art

Referring to FIG. 1, a conventional forging machine 10 is shown to include a workpiece feeding mechanism 101 disposed on a machine frame 19 (see FIG. 3), and a cutting mechanism 102 disposed in front of the feeding mechanism 101. When an elongated blank 103 is straightened and fed to the cutting mechanism 102 by means of the feeding mechanism 101, the cutting mechanism 102 cuts the blank 103 to form a blank section 1040 of a predetermined length. Then the blank section 1040 is sent to a forging die mechanism 106 by a transfer mechanism 105. The forging die mechanism 106 includes fixed tubular die members 107 and punch-moved die members 108. The die members 108 are driven by a power source (not shown) to reciprocate relative to the die members 107. In the forging die mechanism 106, the blank section 1040, as shown in FIG. 2A, is clamped and is moved by the transfer mechanism 105 to the punch-moved die member 108. The blank section 1040 projects from the tubular die member 107 and is forged by means of the punch-moved die member 108 to form a first semi-finished product 1041, as best illustrated in FIG. 2B. The first semi-finished product 1041 is then transferred to the subsequent die member 107 by the transfer mechanism 105 and is further forged by means of the die members 107, 108 to form a second semi-finished product 1042, as best illustrated in FIG. 2C. The second semi-finished product 1042 is further moved by means of the transfer mechanism 105 and is further dealt with by means of the die members 107, 108 to form a final product 1043, as best illustrated in FIG. 2D. To remove a workpiece, such as products 1041, 1042 and 1043, from the corresponding die members 107, a workpiece ejecting mechanism 109 is disposed rearwardly of the die members 107 to push the workpiece out from the die members 107.

Referring to FIGS. 3 and 4, the transfer mechanism 105 has an elongated support member 11 and an elongated swing member 12 mounted on the machine frame 19. The end portions of the support member 11 and the swing member 12 are connected pivotally to one another by means of two connecting members 13 to form a parallelogram linkage system. When the swing member 12 is reciprocated in the directions as indicated by a double-headed arrow 18 by a power source (not shown), the support member 11 is reciprocated in the directions as indicated by the arrow 18. The other components of the transfer mechanism 105 are connected operatively to the machine frame 19, the support member 11 and the swing member 12. The machine frame 19 may have a plurality of transfer mechanisms 105 (only one transfer mechanism 105 is shown in detail in the drawings) provided thereon in order to increase the processing capacity of the forging machine 10. Each of the transfer mechanisms 105 includes an actuating mechanism 14, a push mechanism 15, a lever mechanism 16, and a workpiece holding mechanism 17. The actuating mechanism 14 has a power-driven cam member 141 and a cam-actuated rocker arm 142. The cam-actuated rocker arm 142 has an input end 143 and an output end 144. The input end 143 is actuated by the cam member 141 to move upwardly and downwardly the output end 144. The push mechanism 15 has a pneumatically operated piston 151 disposed under the output end 144. The lever mechanism 16 has a transmission rocker arm 161 connected pivotally to a stationary part 11 of the forging machine 10 The transmission rocker arm 161 has an input end 162 and an output end 163. The input end 162 of the transmission rocker arm 161 is disposed between the output end 144 of the cam-actuated rocker arm 142 and the piston 151. The workpiece holding mechanism 17 is fixed in front of the swing member 12 and has a vertical shaft 171 journalled in the swing member 12. The vertical shaft 171 has an upper end portion that is connected pivotally to the output end 163 of the transmission rocker arm 161, and a lower end portion that is connected perpendicularly to a horizontal shaft 172. The horizontal shaft 172 has a cross pair of clamping members 173 connected pivotally to one another at a front end thereof. Each of the clamping members 173 has a pair of clamping arms 174 coupled to a lower end thereof. In operation, the cam member 141 is actuated to rotate. Before the cam member 141 cams the input end 143 of the cam-actuated rocker arm 142, the piston 151 pushes upwardly the input end 162 and the output end 144, thereby resulting in downward movement of the output end 163. The vertical shaft 171 in the swing member 12 then descends to move the clamping members 173 toward one another via the horizontal shaft 172. As such, the blank sections 1040, 1041, 1042, and 1043 can be clamped by the clamping members 173, as best illustrated in FIGS. 2A to 2D. On the other hand, when the cam member 141 is rotated to actuate the cam-actuated rocker arm 142, the vertical shaft 171 can be lifted upwardly to move the clamping members 173 away from one another in order to release the blank sections 1040, 1041, 1042, and 1043. During the clamping and releasing operations of the clamping members 173, the swing member 12 reciprocates by action of the power source along the direction indicated by the arrow 18 in order to deliver blank sections 1040, 1041, 1042, and 1043 among the forging die mechanisms 106.

The conventional transfer mechanism 105 suffers from the following disadvantages:

1. With reference to FIG. 3, since the swing member 12 is relatively long and is suspended on the front side of the machine frame 19 by means of the connecting members at two ends thereof, the swing member 12 has an insufficient rigidity and is liable to flex or deform. Therefore, when a vertical force is exerted on the swing member 12 via the output end 163 of the transmission rocker arm 161, the swing member 12 will vibrate during the reciprocating movement of the swing member 12. The vibration of the swing member 12 results in shaking or wobbling of the blank sections 1040, 1041, 1042, 1043, thereby affecting adversely the subsequent die-punching process for the blank sections 1040, 1041, 1042, 1043.

2. With reference to FIG. 1, since the distance among the die members 107 or 108 is set to be small in order to minimize the stroke of the swing member 12, the spaces among the push mechanisms 15 are limited. As such, the size of an air cylinder or spring that is disposed under the input end 162 and the output end 144 and that is adapted to reciprocate the piston 151 is limited. Therefore, the force exerted on the input end 162 by the piston 151 is limited, thereby limiting the clamping force of the clamping members 173 and reducing the manufacturing speed and yield.

3. Each pair of clamping members 173 on each of the workpiece holding mechanisms 17 moves away from one another by an opening angle to release a corresponding one of the blank sections 1040, 1041, 1042, and 1043 before a corresponding one of the punch-moved die members 108 punches the corresponding one of the blank sections 1040, 1041, 1042, and 1043. However, since the opening angle of each pair of the clamping members 173 is relatively small, the clamping members 173 cannot move across the die member 108 to an adjacent die member 107 in order to clamp another blank section that is ejected out from the die member 107 by a corresponding one of the workpiece ejecting mechanisms 109 unless the die member 109 moves away from the die member 107. As such, the time required for manipulating the transfer mechanisms 105 is relatively long.

SUMMARY OF THE INVENTION

The object of the present invention is to provide a transfer mechanism for a forging machine that has an improved structural strength and that can hold blank sections in a more stable manner.

Another object of the present invention is to provide a transfer mechanism for a forging machine that can be manipulated in a time-efficient manner.

According to the present invention, a workpiece transfer device comprises an elongated hollow housing, a plurality of actuating mechanisms, a plurality of push mechanisms, a plurality of coupling devices, a plurality of levex mechanisms, and an elongated swing member.

Each of the actuating mechanisms has a cam member, and an actuating rocker arm operatively connected to the cam member. The actuating rocker arm of each of the actuating mechanisms has an output end that extends over a top side of the housing and that is movable toward and away from the top side of the housing when the cam member is actuated.

The push mechanisms have a plurality of spindles disposed inside and spaced longitudinally of the housing and movable vertically relative to the top side of the housing, and a plurality of biasing units for urging the spindles to move upwardly Each of the spindles has an upper end extending through the top side of the housing to abut against the output end of the actuating rocker arm of a corresponding one of the actuating mechanisms by biasing action of a corresponding one of the biasing units. Each of the spindles is movable downwardly against the biasing action of the corresponding one of the biasing units when the output end of the actuating rocker arm of the corresponding one of the actuating mechanisms moves downwardly.

Each of the coupling devices has a cylindrical sleeve member sleeved rotatably on a corresponding one of the spindles, and at least one cantilever extending radially from the sleeve member for turning about the corresponding one of the spindles. The cantilever of each of the coupling devices has a distal end distal from the corresponding one of the spindles.

Each of the lever mechanisms has a lever connected pivotally to the cantilever of a corresponding one of the coupling devices. The lever of each of the lever mechanisms has a first end portion engaging the corresponding one of the spindles to move upwardly and downwardly therewith, and a second end portion adjacent to the distal end of the cantilever of the corresponding one of the coupling devices.

The elongated swing member is connected pivotally to the distal end of the cantilever of each of the coupling devices to swing in a swing direction that is parallel to a length of the housing. The swing member has a plurality of primary vertical shafts extending therethrough and spaced longitudinally thereof. Each of the primary vertical shafts has an upper end that is connected universally to the second end portion of the lever of a corresponding one of the lever mechanisms in order to move upwardly and downwardly together with the second end portion of the lever of the corresponding one of the lever mechanisms.

As disclosed herein, the workpiece transfer device further comprises a plurality of workpiece holding devices connected operatively to the primary vertical shafts for clamping and releasing workpieces when the primary vertical shafts are moved upwardly and downwardly by the lever mechanisms. Each of the biasing units has an air cylinder disposed outside the housing, a piston member disposed in the air cylinder, and a push rocker arm. The push rocker arm of each of the biasing units has opposite first and second ends that abut respectively against the piston member and a lower end of the corresponding one of the spindles.

In a preferred embodiment, the swing member includes an elongated hollow casing of a generally rectangular cross section and having a top wall, a front wall connected perpendicularly to the top wall, and a plurality of pillars extending upwardly from the top wall. Each of the pillars has an axial through hole extending into an interior of the casing. The axial through hole of each of the pillars has a corresponding one of the primary vertical shafts journalled therein. The distal end of each of the cantilevers is connected perpendicularly and pivotally to a corresponding one of the pillars. Each of the workpiece holding devices has a pair of horizontal shafts extending perpendicularly through and journalled in the front wall of the casing. The horizontal shafts have inner ends disposed inside the casing, and outer ends disposed outside the casing. Each of the workpiece holding devices further has two gear members fixed respectively adjacent to the inner ends of the horizontal shafts and meshing with one another, two cross members connected respectively and perpendicularly to the outer ends of the horizontal shafts, and two clamping arms connected respectively to the cross members. Each of the primary vertical shafts has a lower end connected to one of the gear members on the horizontal shafts of a corresponding one of the workpiece holding devices in order to turn the gear members relative to one another, thereby turning the clamping arms to move toward and away from one another via the horizontal shafts and the cross members. A linking plate is connected pivotally to the pillars of the swing member and is elongated in a direction parallel to the swing direction.

In an alternate preferred embodiment, the swing member has an elongated base of a generally rectangular cross section and having a top face, a front face connected perpendicularly to the top face, and a plurality of hollow pillars extending upwardly from the top face. Each of the pillars is connected perpendicularly and pivotally to the distal end of a corresponding one of the cantilevers. Each of the primary vertical shafts extends into and is journalled in a corresponding one of the pillars.

Each of the primary vertical shafts has a lower end and a longitudinal rack portion formed adjacent to the lower end thereof. Each of the pillars has an opening facing the housing, a hollow block sleeved thereon and having an inner space communicated with the opening, a pinion disposed in the inner space and having teeth that extend into each of the pillars through the opening and that engage the longitudinal rack portion of a corresponding one of the primary vertical shafts, two connecting shafts extending oppositely from the pinion through the hollow block and extending transversely of a corresponding one of the pillars, and two crank arms connected perpendicularly and respectively to distal ends of the connecting shafts and extending forwardly to the front face of the base on opposite sides of the hollow block.

The front face of the base has a plurality of horizontal shafts extending forwardly therefrom and staggered vertically with respect to vertical lines passing through the pillars. Each of the workpiece holding devices has a secondary vertical shaft disposed in front of the front face of the base of the swing member and a corresponding one of the pillars, and connected pivotally to distal ends of the crank arms in order to move upwardly and downwardly when the primary vertical shafts are moved upwardly and downwardly. Each of the workpiece holding devices further has two link rods having upper ends connected pivotally to a lower end of the secondary vertical shaft and lower ends, two cross members having intermediate portions connected pivotally and respectively to the lower ends of the link rods, two swing ends, and two pivot ends that are connected pivotally to two adjacent ones of the horizontal shafts, and two clamping arms connected respectively to the swing ends.

BRIEF DESCRIPTION OF THE DRAWINGS

Other features and advantages of the present invention will become apparent in the following detailed description of the preferred embodiments of the invention, with reference to the accompanying drawings, in which.

DETAILED DESCRIPTION OF THE PREFERRED EMBODIMENTS

Figure 1:
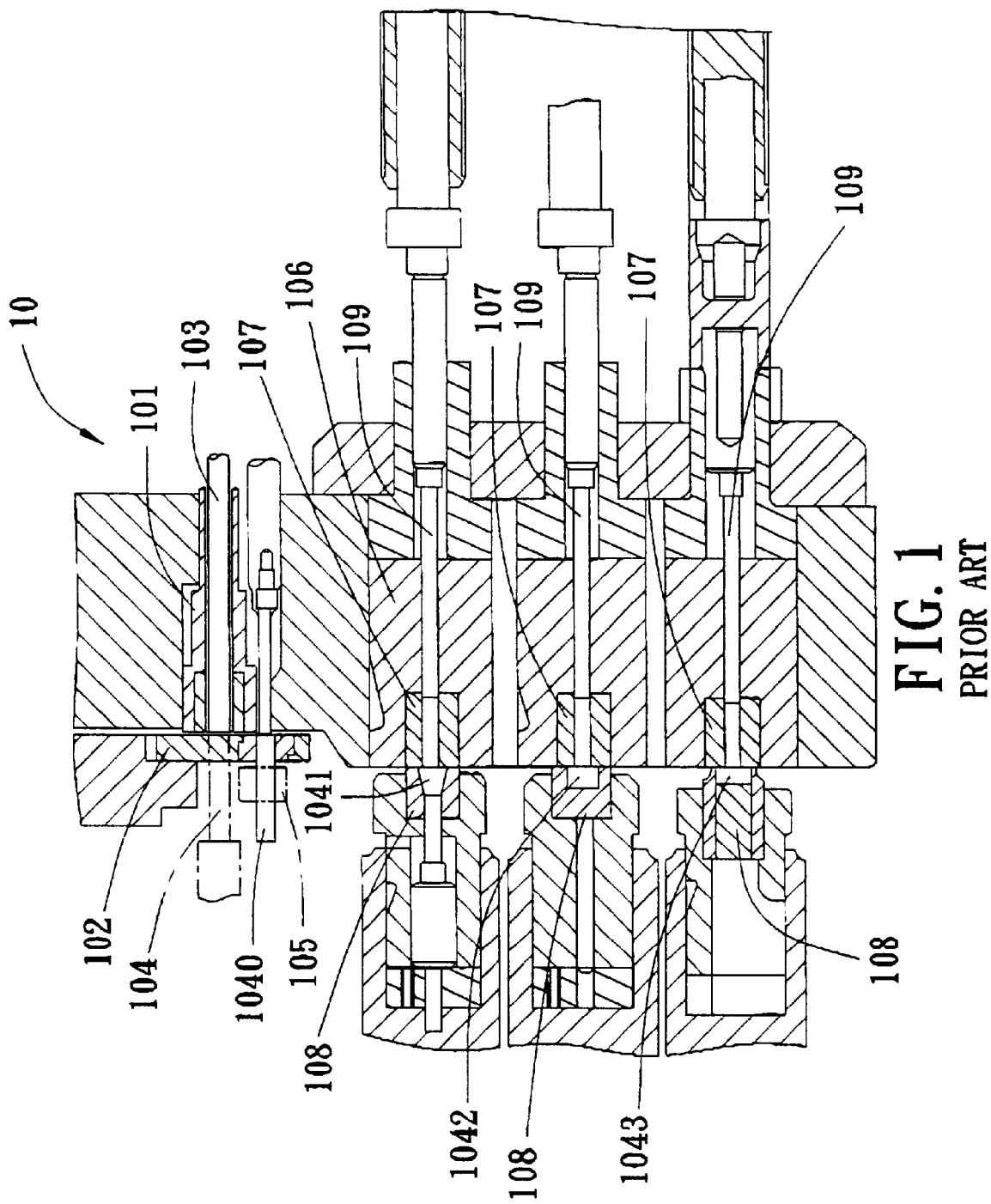
FIG. 1 is a cross sectional schematic view of a conventional forging machine.
Figure 2A:
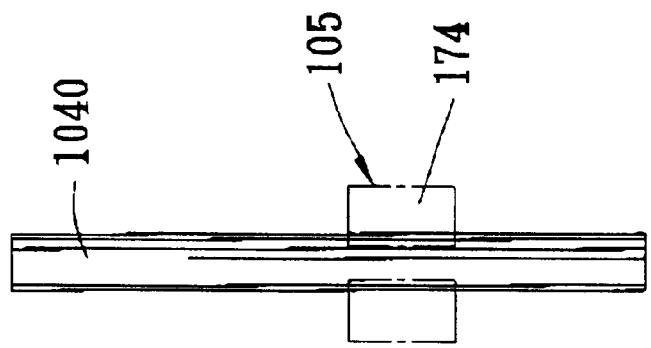
FIGS. 2A, 2B, 2C and 2D illustrate how a bolt is formed by the conventional forging machine.
Figure 2B:
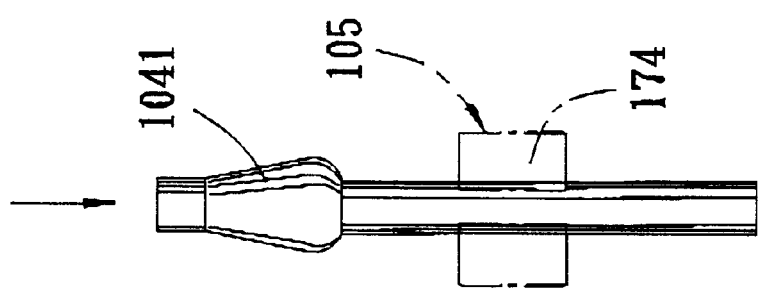
Figure 2C:
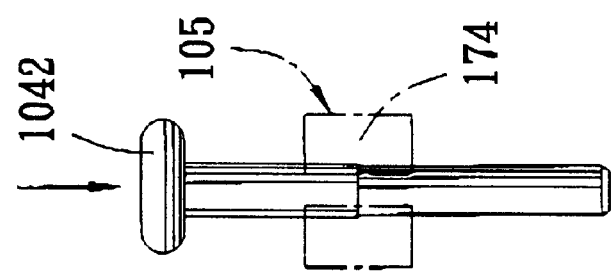
Figure 2D:
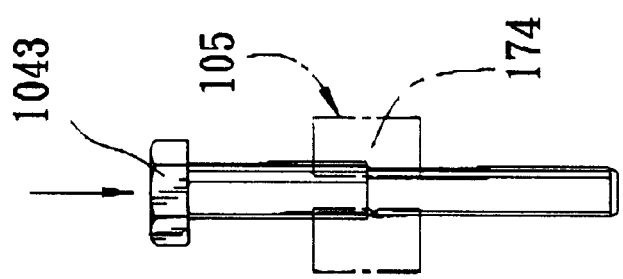
Figure 3:
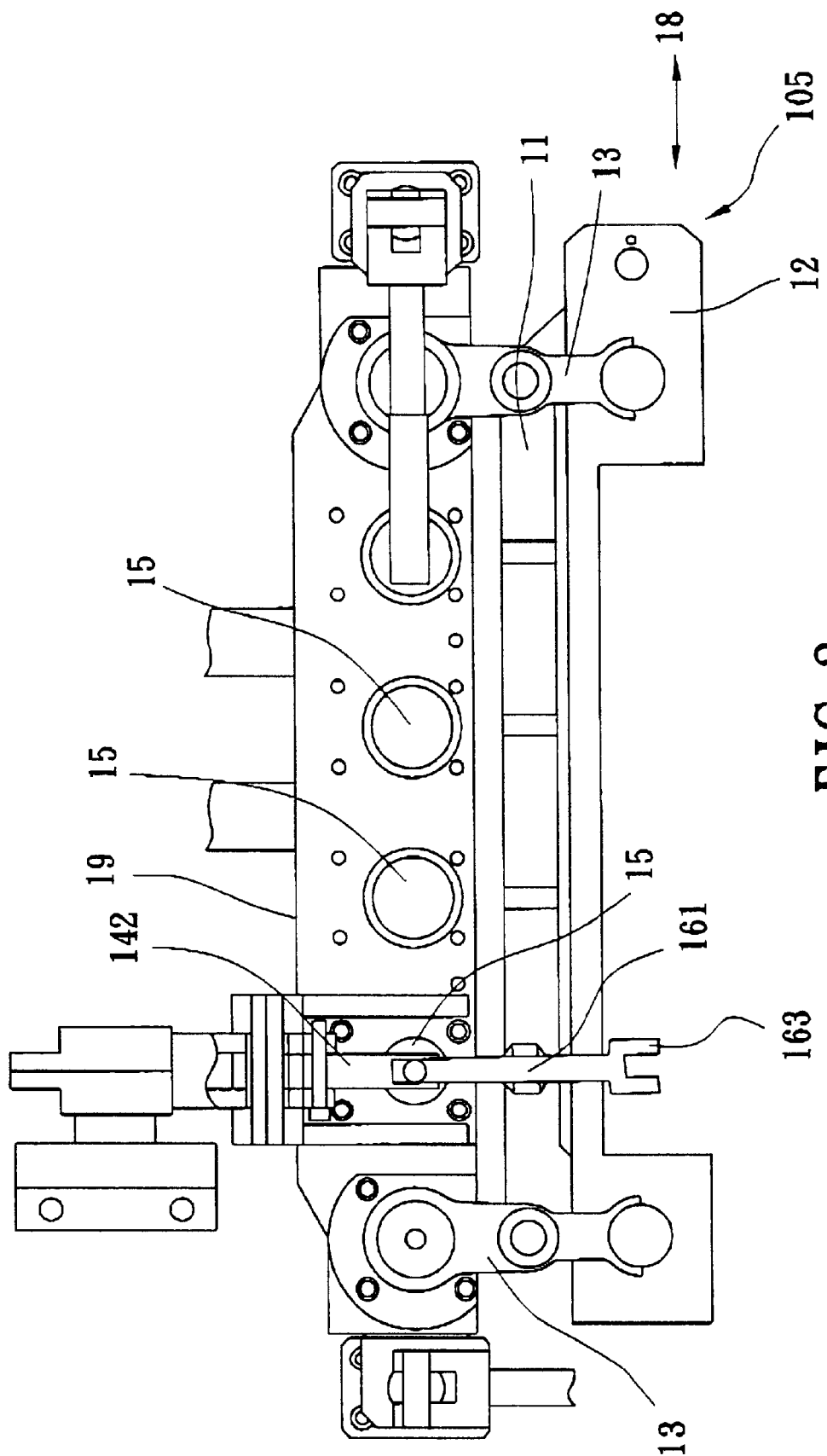
FIG. 3 is a top schematic view of a conventional transfer mechanism for the conventional forging machine.
Figure 4:
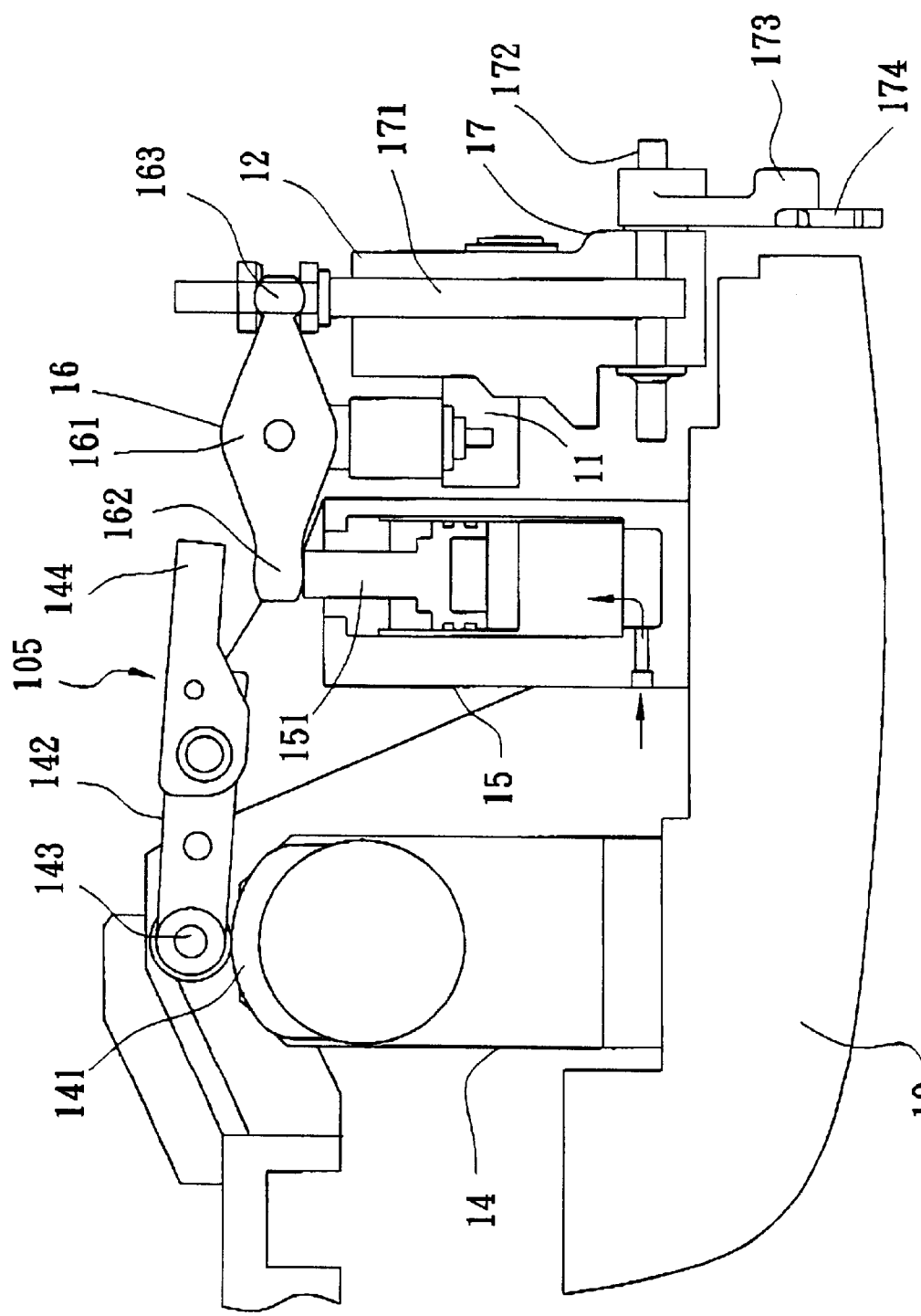
FIG. 4 is a side schematic view of the conventional transfer mechanism.
Figure 5:
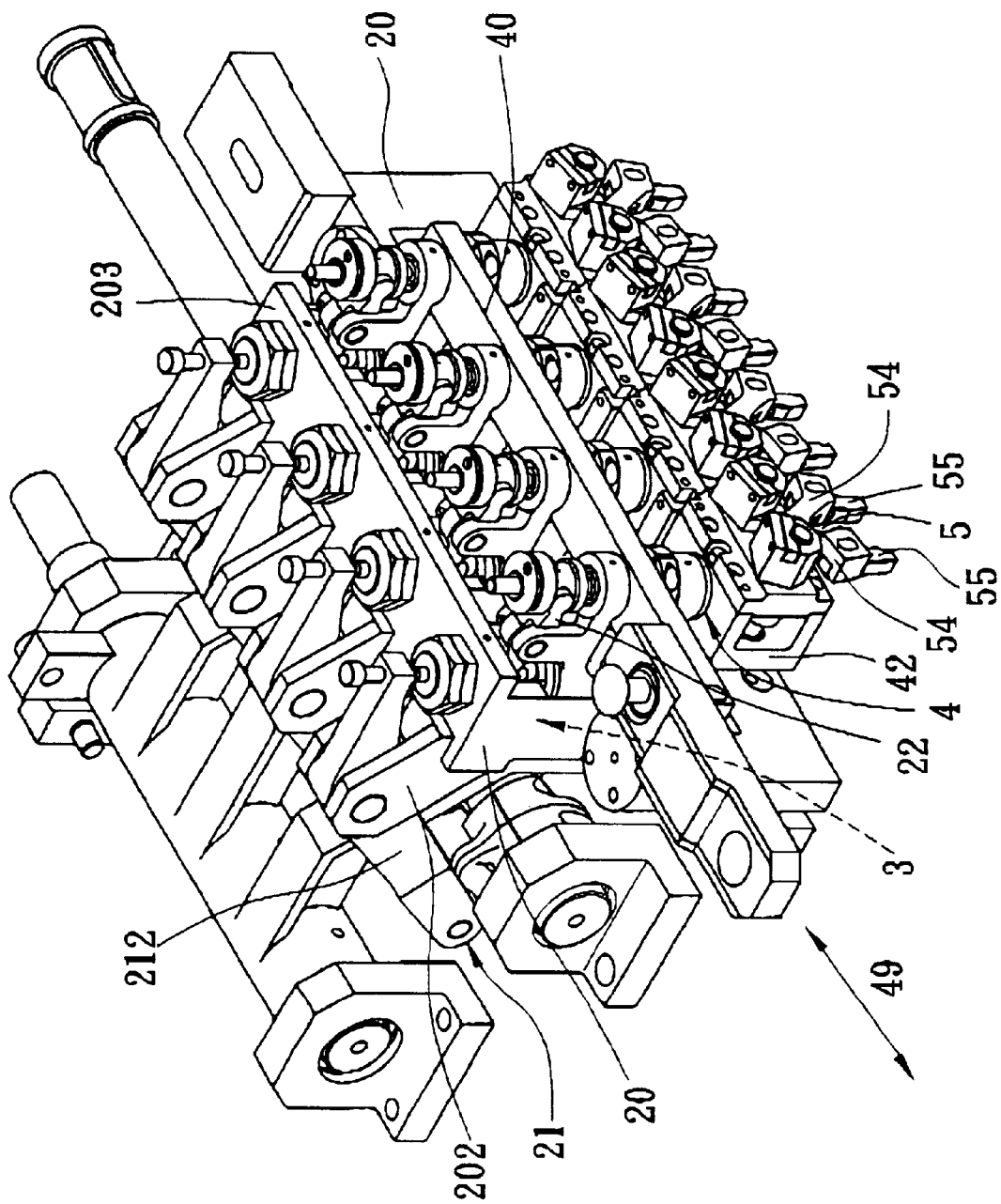
FIG. 5 is a perspective view of a first preferred embodiment of a workpiece transfer device according to the present invention.
Figure 6:
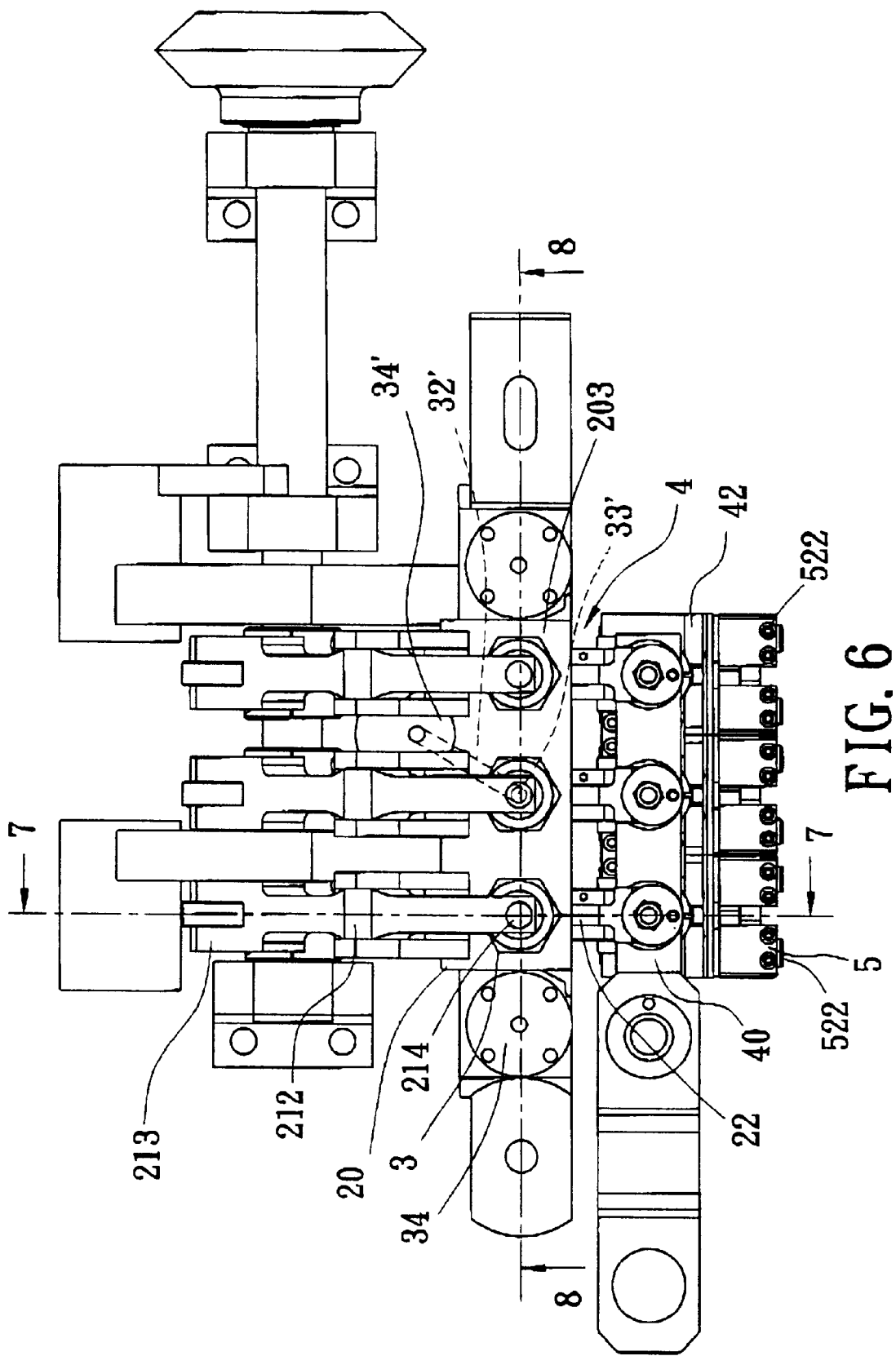
FIG. 6 is a top view of the first preferred embodiment of the workpiece transfer device according to the present invention.

Referring to FIGS. 5 and 6, a first preferred embodiment of a workpiece transfer device for a forging machine according to the present invention is shown to comprise an elongated hollow housing 20 adapted to be mounted on a machine frame of the forging machine (not shown) The workpiece transfer device further comprises a plurality of actuating mechanisms 21, a plurality of push mechanisms 3, a plurality of coupling devices 4, a plurality of lever mechanisms 22, an elongated swing member 42, and a plurality of workpiece holding devices 5.

Figure 7:
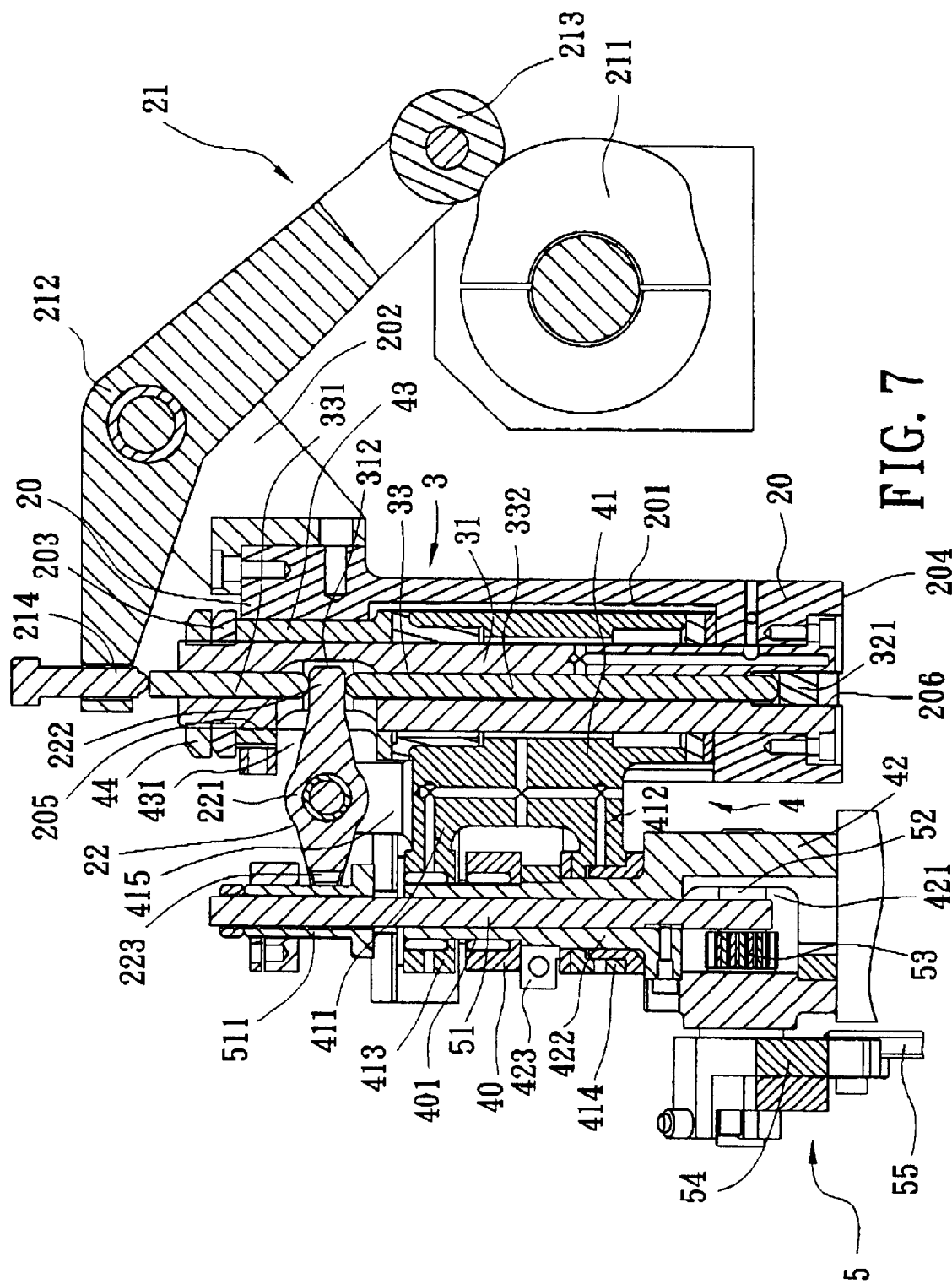
FIG. 7 is a cross sectional view generally taken along lines 7—7 of FIG. 6.
Figure 8:
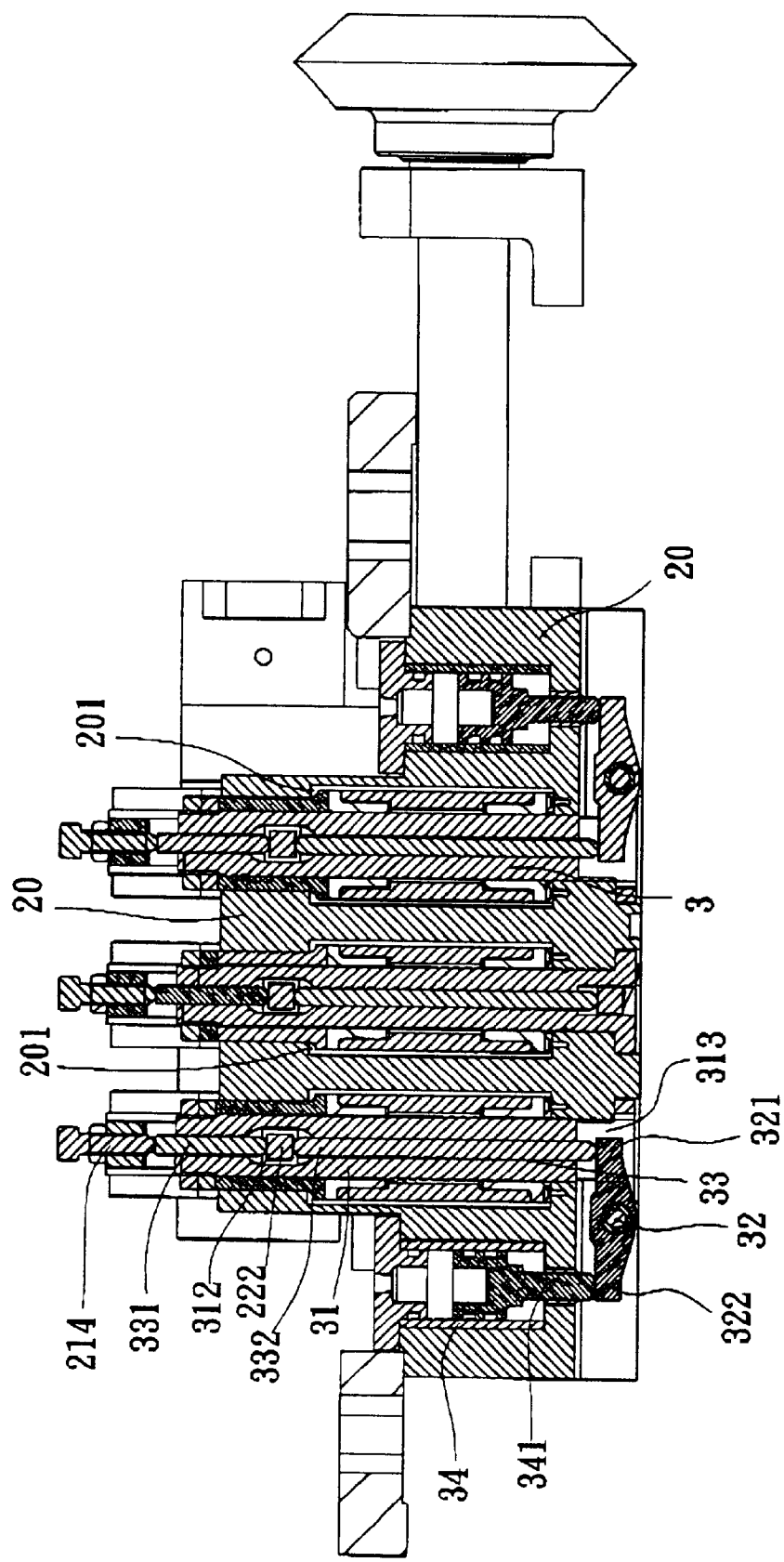
FIG. 8 is a cross sectional view generally taken along lines 8—8 of FIG. 6.

Referring to FIGS. 7 and 8, the housing 20 is in the form of a cabinet having a top wall 203, a bottom wall 204, and four separate compartments 201 opening forwardly thereof. Each of the compartments 201 has two aligned holes 205, 206 formed respectively in the top and bottom walls 203, 204. The housing 20 has four bracket arms 202 extending obliquely and upwardly from rear walls of the compartments 201.

Referring to FIGS. 6 and 7, each of the actuating mechanisms 21 has a power-driven cam member 211 disposed behind the housing 20, and an actuating rocker arm 212 that is connected pivotally to a distal end of a corresponding one of the bracket arms 202 and that is connected operatively to the cam member 211. Each of the actuating rocker.arms 212 has an output end 214 that extends over the top wall 203 of the housing 20 and that is movable toward and away from the top wall 203 when the cam member 211 is actuated.

Figure 9:
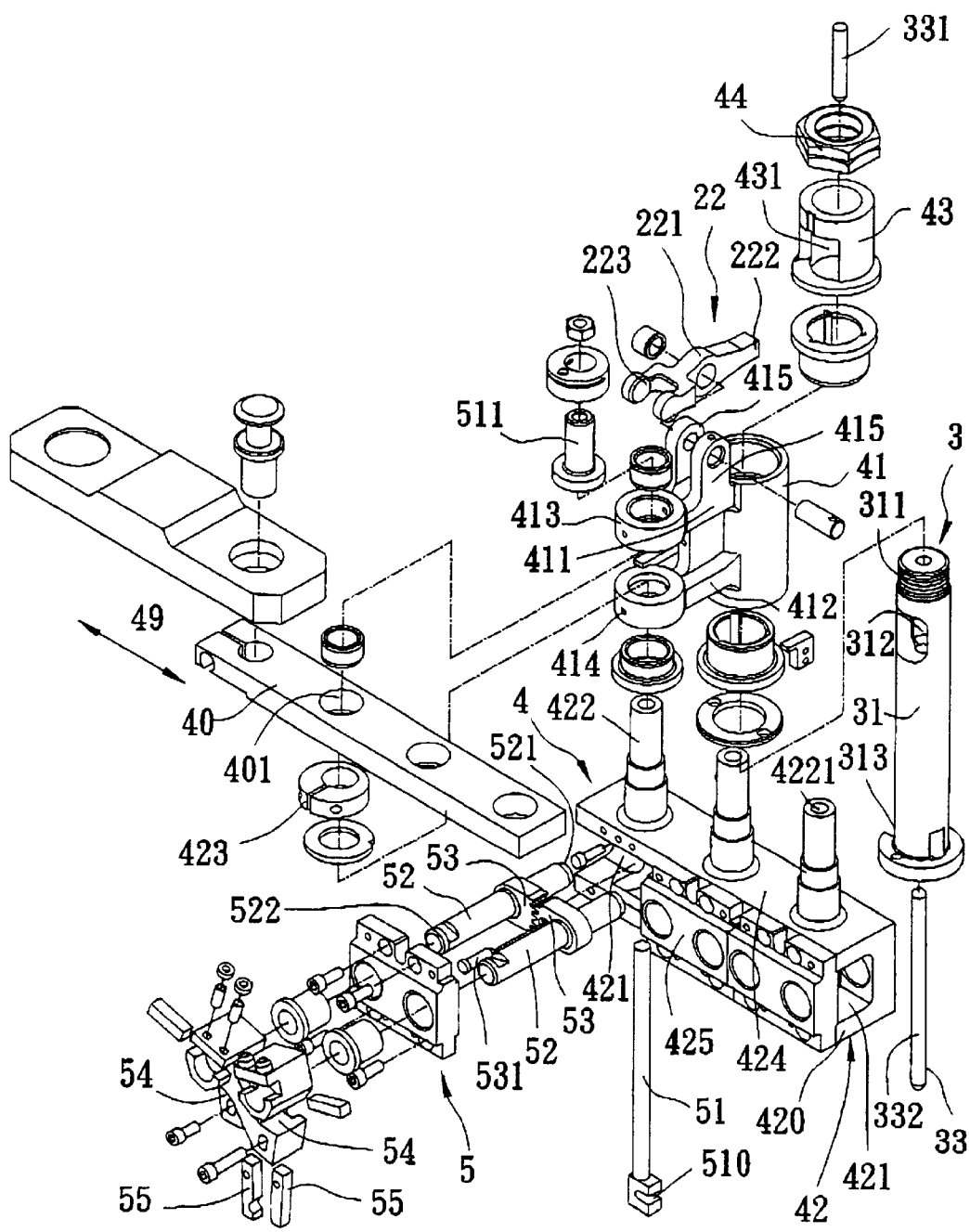
FIG. 9 is a perspective exploded view of a part of the first preferred embodiment of the workpiece transfer device according to the present invention.

Referring to FIGS. 7, 8 and 9, each of the push mechanisms 3 has a hollow cylindrical member 31 connected to the holes 205, 206 at two ends thereof inside a respective one of the compartments 201 and spaced longitudinally of the housing 20. Each cylindrical member 31 has an upper end 311 provided with an external thread, an elongated slot 312 opening forwardly of the housing 20 adjacent to the upper end 311, a notch 313 formed in a lower end thereof, and a spindle 33 journalled therein and movable vertically relative to the top wall 203 of the housing 20. Each of the spindles 33 has an upper section 331 and a lower section 332 that is disconnected from the upper section 331 adjacent to the slot 312. Each of the push mechanisms 3 further has an air cylinder 34 disposed outside the corresponding one of the compartments 201 of the housing 20, a piston member 341 disposed in the air cylinder 34, and a push rocker arm 32. Each push rocker arm 32 has a first end 322 that abuts against a lower end of the piston member 341, and a second end 321 that extends into the notch 313 and that abuts against a lower end of a corresponding one of the spindles 33. Each of the air cylinders 34 is connected to a compressed air supply (not shown) in order to push constantly the piston member 341 to move downwardly. As such, the upper ends of the spindles 33 can be moved upwardly to extend through the top wall 203 of the housing 20 and to abut against the output ends 214 of the actuating rocker arms 212 by the air cylinders 34. The spindles 33 are movable downwardly against the biasing action of the air cylinders 34 when the output ends 214 are moved downwardly by the cam members 211.

Referring to FIGS. 7 and 9, each of the coupling devices 4 is disposed forwardly of a corresponding one of the push mechanisms 3, and has a cylindrical sleeve member 41 sleeved rotatably on a corresponding one of the cylindrical members 31 inside a corresponding one of the compartments 201, and upper and lower cantilevers 411, 412 extending radially from the sleeve member 41 for turning about the corresponding one of the cylindrical members 31 Each of the sleeve members 41 has an upper sleeve 43 that is disposed on an upper end thereof and that has a window 431 formed therein. Nut members 44 engage the external threads on the upper ends of the cylindrical members 31 in order to position the upper sleeves 43 and the sleeve members 41 such that the windows 431 in the upper sleeves 43 are aligned with the elongated slot 312 of the corresponding one of the cylindrical members 31. Each of the upper and lower cantilevers 411, 412 has a ring-shaped distal end 413, 414 distal from the corresponding one of the cylindrical members 31. Each of the upper cantilevers 411 further has a spaced pair of lugs 415 extending upwardly therefrom.

Referring again to FIGS. 7, 8 and 9, each of the lever mechanisms 22 has a lever 221 connected pivotally to the lugs 415 on a corresponding one of the upper cantilevers 411. Each of the levers 221 has a first end portion 222 extending through a corresponding one of the windows 431 and the elongated slots 312 and sandwiched between the upper and lower sections 331, 332 of the corresponding one of the spindles 33 to move upwardly and downwardly therewith, and a second end portion 223 adjacent to the distal end 413 of the corresponding one of the upper cantilevers 411.

The elongated swing member 42 is connected pivotally to the distal ends 413, 414 of the cantilevers 411, 412 of each of the coupling devices 4 to swing in a swing direction that is parallel to the length of the housing 20, as indicated by the double-headed arrow 49 in FIG. 9. More specifically, the swing member 42 includes an elongated hollow casing 420 of a generally rectangular cross section and having a top wall 424, a front wall 425 connected perpendicularly to the top wall 424, and a plurality of pillars 422 extending upwardly from the top wall 424. Each of the pillars 422 extends through the ring-shaped distal ends 413, 414 of a corresponding one of the coupling mechanisms 4, and is connected rotatably and perpendicularly to the upper and lower cantilevers 411, 412 by virtue of a C-shaped clamp 423, as best illustrated in FIG. 7. Each of the pillars 422 has an axial through hole 4221 extending into an interior 421 of the casing 420, as best illustrated in FIG. 9. Each of the axial through holes 4221 has a primary vertical shaft 51 journalled therein. Each of the primary vertical shafts 51 has an upper end provided with a fastening tube 511 that is seated on the distal end 413 of a corresponding one of the upper cantilevers 411 and that is connected universally to the second end portion 223 of a corresponding one of the levers 221 in order to move upwardly and downwardly together with the second end portion 223 of the corresponding one of the levers 221 and in order to turn relative to the same when the swing member 42 moves in the swing direction as indicated by the arrow 49.

Referring to FIGS. 6, 7 and 9, each of the workpiece holding devices 5 has a pair of horizontal shafts 52 extending perpendicularly through and journalled in the front wall 425 of the casing 420. The horizontal shafts 52 have inner ends 521 disposed inside the casing 420, and outer ends 522 disposed outside the casing 420. Each of workpiece holding devices 5 further has two gear members 53 fixed respectively adjacent to the inner ends 521 of the horizontal shafts 52 and meshing with one another, two cross members 54 connected respectively and perpendicularly to the outer ends 522 of the horizontal shafts 52, and two clamping arms 55 connected respectively to the cross members 54. Each of the primary vertical shafts 51 has a lower end 510 connected to one of the gear members 53 on a corresponding one of the horizontal shafts 52 by virtue of a connection rod 531 that is, in turn, connected to one of the gear members 53 in order to turn the gear members 53 relative to one another, thereby turning the clamping arms 55 to move toward and away from one another via the horizontal shafts 52 and the cross members 54.

Referring to FIGS. 5, 6, 7 and 9, a linking plate 40 is connected pivotally to the pillars 422 of the swing member 42 between the distal ends 413, 414 of the upper and lower cantilevers 411, 412, and is elongated in a direction parallel to the swing direction as indicated by the arrow 49. More specifically, the linking plate 40 has a plurality of holes 401 through which the pillars 422 extend. One end of the linking plate 40 is connected to a driving mechanism (not shown) to reciprocate in the swing direction as indicated by the arrow 49, thereby resulting in swinging of the swing member 42 and the coupling mechanisms 4 about the cylindrical members 31.

In operation, the cam member 211 is driven to turn the actuating rocker arms 212. When the output ends 214 of the actuating rocker arms 212 move upwardly to permit the spindles 33 to move upwardly by means of the air cylinders 34, the first end portions 222 of the levers 221 are moved upwardly together with the spindles 33, whereas the second end portions 223 are moved downwardly to move the primary vertical shafts 51 downwardly. The downward movement of the primary vertical shafts 51 rotates, the gear members 53 relative to one another via the connection rods 531, thus resulting in relative rotation of the horizontal shafts 52 and the cross members 54. At this time, the clamping arms 55 in each pair are moved toward one another to clamp a blank section 100, as shown in FIG. 10.

When the cam member 211 is driven to rotate the actuating rocker arms 212 to enable the output ends 214 to depress the spindles 33 downwardly against the biasing action of the air cylinders 34, the first end portions 222 of the levers 221 move downwardly together with the spindles 33, while the second end portions 223 move upwardly to move the primary vertical shafts 51 upwardly. The upward movement of the primary vertical shafts 51 rotates the gear members 53 relative to one another via the connection.rods 531, thus resulting in relative rotation of the horizontal shafts 52 and the cross members 54. At this time, the clamping arms 55 in each pair are moved away from one another to release the blank section 100.

Figure 10:
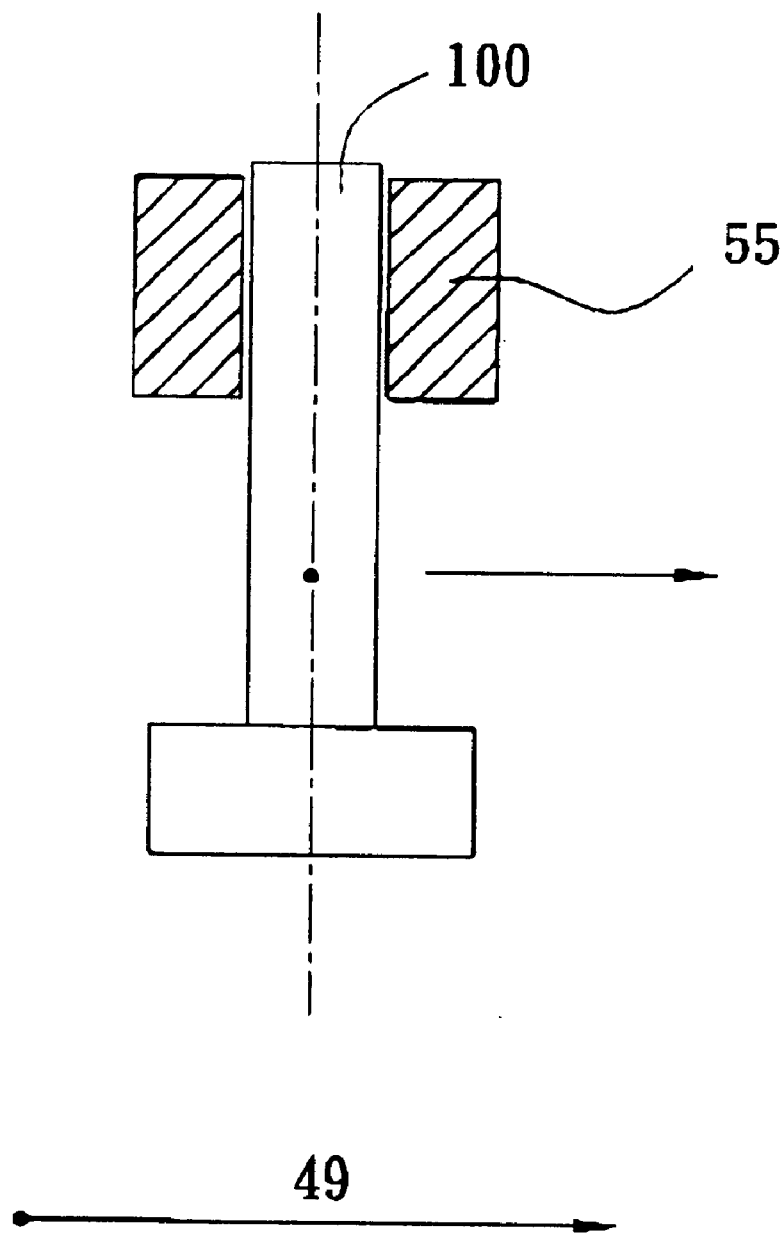
FIG. 10 is a schematic view illustrating how a workpiece holding device of the workpiece transfer device of the first preferred embodiment moves when holding a blank section.

On the other hand, when the clamping arms 55 are moved toward and away from one another, the linking plate 40 can be driven by the driven mechanism in a conventional manner to reciprocate in the swing direction 49, as best illustrated in FIG. 10.

Figure 11:
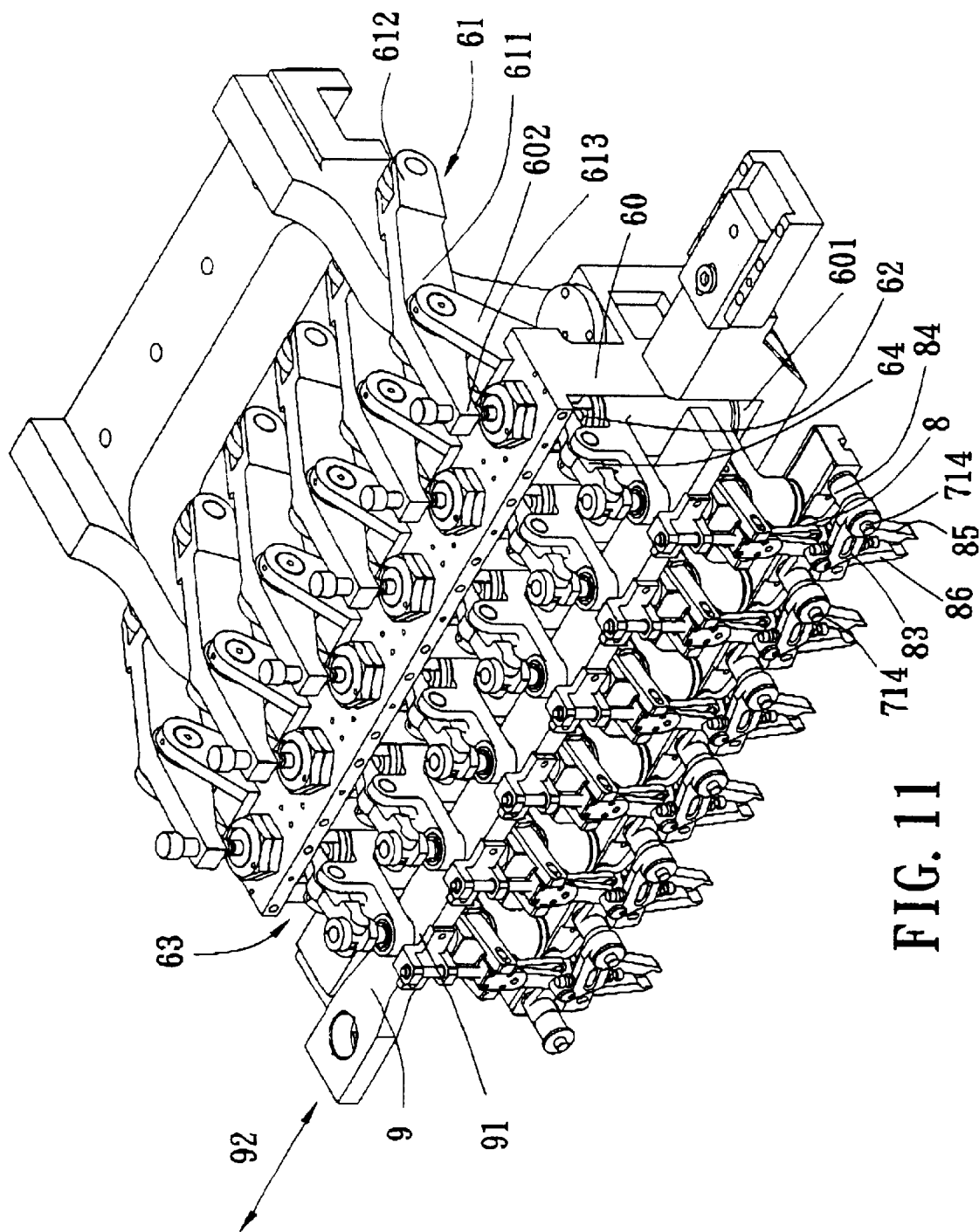
FIG. 11 is a perspective view of a second preferred embodiment of a workpiece transfer device according to the present invention.
Figure 12:
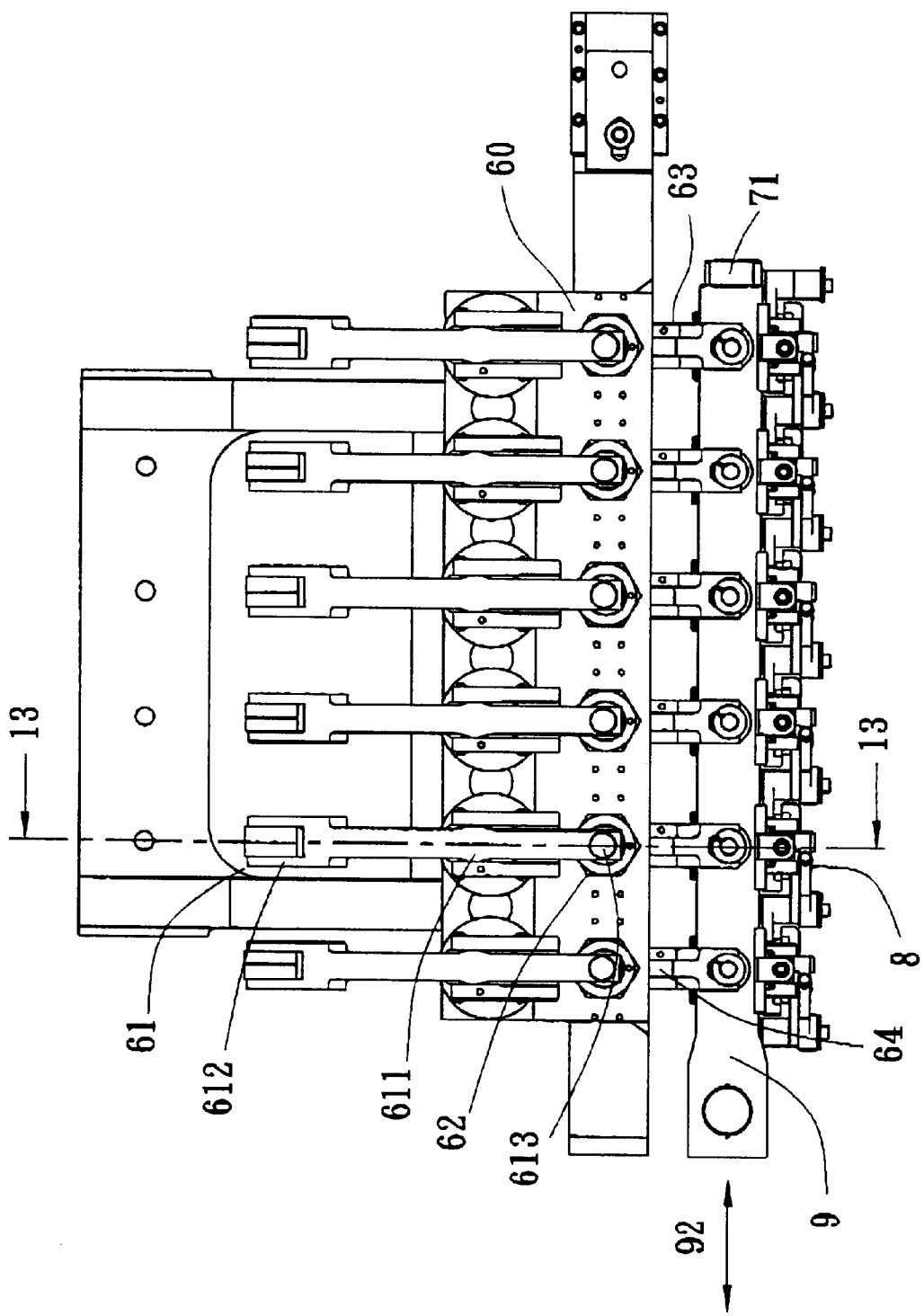
FIG. 12 is a top view of the second preferred embodiment of the workpiece transfer device according to the present invention.

Referring to FIGS. 11 and 12, a second preferred embodiment of a workpiece transfer device for a forging machine according to the present invention is shown to comprise an elongated hollow housing 60 adapted to be mounted on a machine frame of the forging machine (not shown). The workpiece transfer device further comprises a plurality of actuating mechanisms 61, a plurality of push mechanisms 62, a plurality of coupling devices 63, a plurality of lever mechanisms 64, an elongated swing member 71, and a plurality of workpiece holding devices 8.

Figure 13:
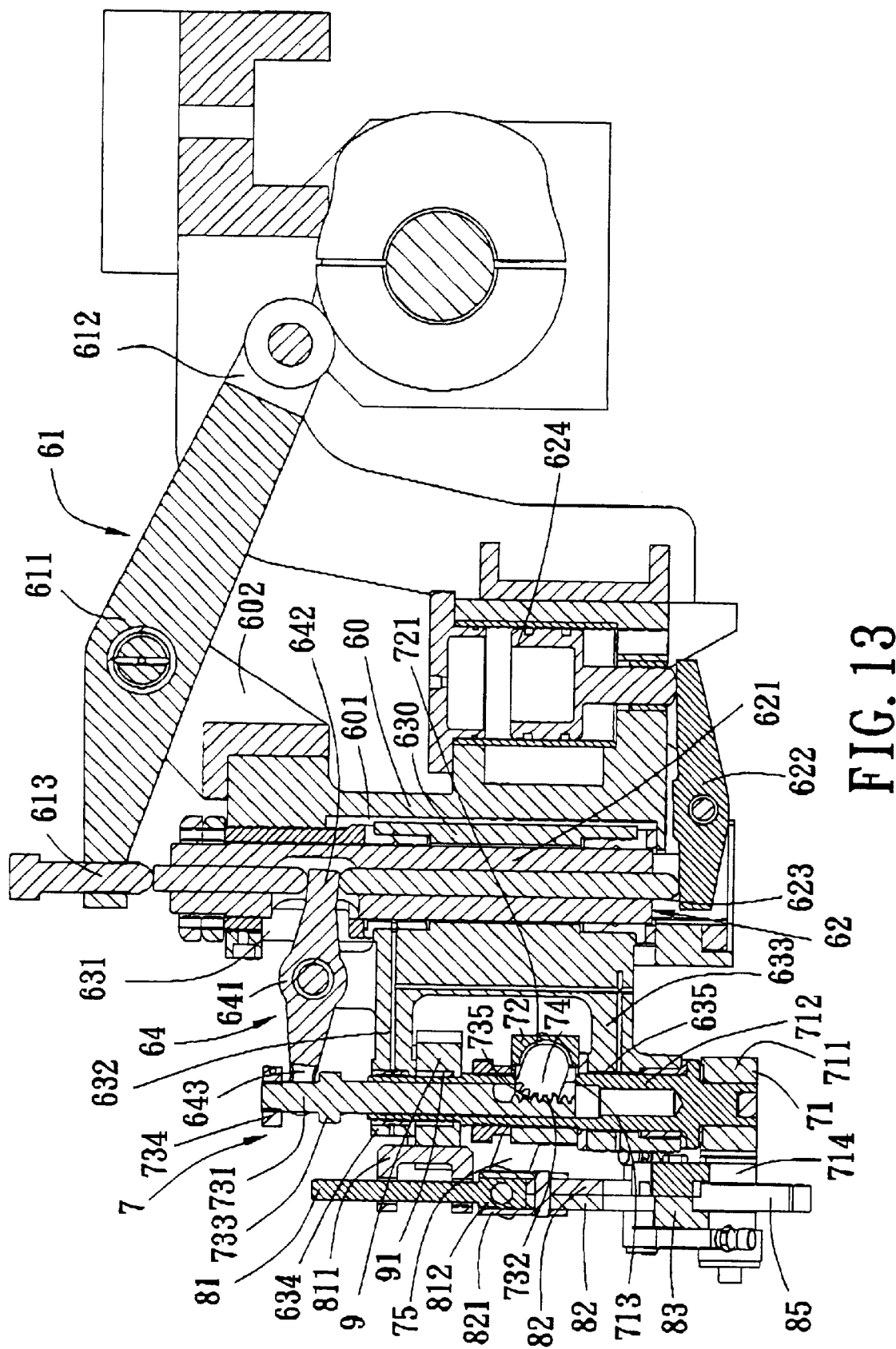
FIG. 13 is a cross sectional view generally taken along lines 13—13 of FIG. 12.

Referring to FIGS. 11 and 13, the housing 60 is in the form of a cabinet having six separate compartments 601 opening forwardly thereof. The housing 60 has six bracket arms 602 extending obliquely and upwardly from rear walls of the compartments 601.

Referring to FIGS. 12 and 13, each of the actuating mechanisms 61 has an actuating rocker arm 611 that is connected pivotally to a distal end of a corresponding one of the bracket arms 602 and that is connected operatively to a cam member (not shown). Each of the actuating rocker arms 611 has an output end 613 that can be driven by the cam member to move toward and away from a top wall of the housing 60, in a manner similar to that in the first preferred embodiment.

Figure 14:
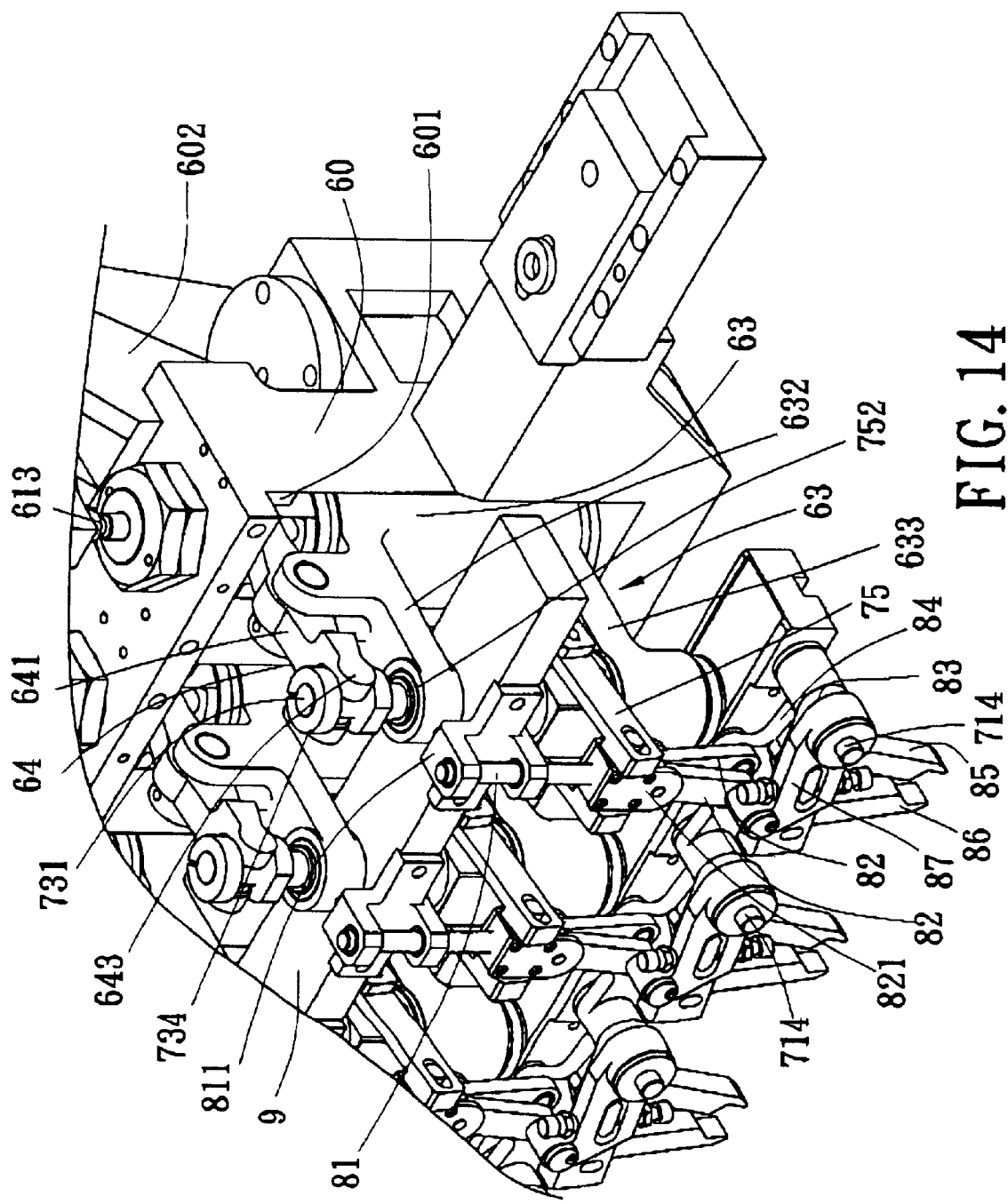
FIG. 14 is a fragmentary perspective view of the second preferred embodiment of the workpiece transfer device according to the present invention.
Figure 15:
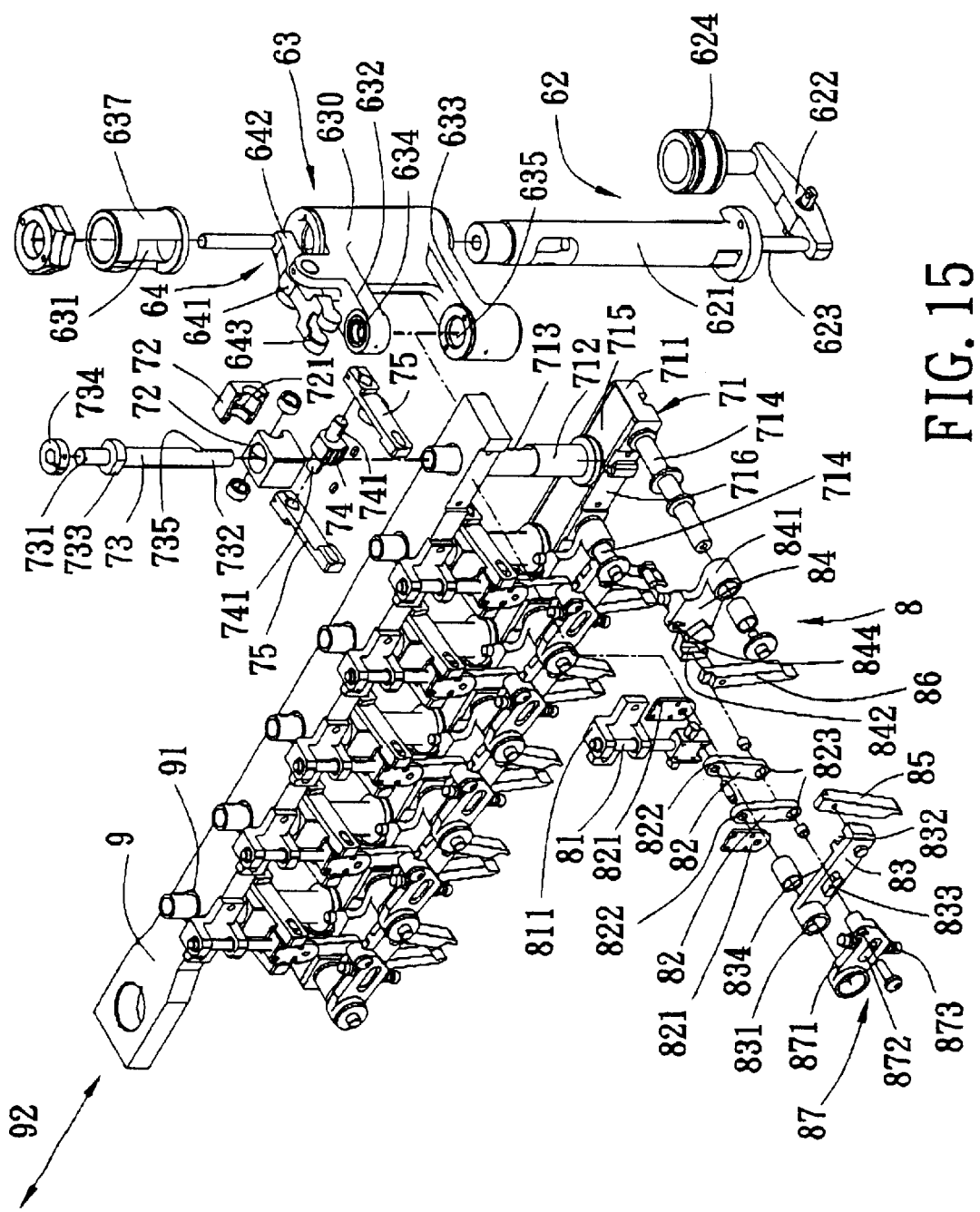
FIG. 15 is a perspective exploded view of a part of the second preferred embodiment of the workpiece transfer device according to the present invention.

Referring to FIGS. 13, 14 and 15, the structure of the push mechanisms 62 is similar to that of the push mechanisms 3. Each of the push mechanisms 62 has a hollow cylindrical member 621 disposed inside a respective one of the compartments 601 and spaced longitudinally of the housing 60, a spindle 623 journalled in the cylindrical member 621, an air cylinder 624 disposed outside the corresponding one of the compartments 601 of the housing 60, and a push rocker arm 622 connected operatively to the air cylinder 624 and a lower end of the spindle 623 in a manner similar to that in the first preferred embodiment. Each of the air cylinders 624 is connected to a compressed air supply (not shown) in order to push constantly a corresponding one of the spindles 623 upwardly to abut against the output ends 613 of the actuating rocker arms 611.

The structure of the coupling devices 63 is similar to that of the coupling devices 4 in the first preferred embodiment. Each of the coupling devices 63 has a cylindrical sleeve member 630 sleeved rotatably on a corresponding one of the cylindrical members 621 inside a corresponding one of the compartments 601, and upper and lower cantilevers 632, 633 extending radially from the sleeve member 630 for turning about the corresponding one of the cylindrical members 621. Each of the sleeve members 41 has an upper sleeve 637 that is disposed on an upper end thereof and that has a window 631 formed therein. Each of the upper and lower cantilevers 632, 633 has a ring-shaped distal end 634, 635 distal from the corresponding one of the cylindrical members 621.

Each of the lever mechanisms 64 has a lever 641 connected pivotally to a corresponding one of the upper cantilevers 632. Each of the levers 641 has a first end portion 642 extending through a corresponding one of the windows 631 and engaging the corresponding one of the spindles 623 to move upwardly and downwardly therewith, and a second end portion 643 adjacent to the distal end 634 of the corresponding one of the upper cantilevers 632.

The elongated swing member 71 is connected pivotally to the distal ends 634, 635 of the cantilevers 632, 633 of each of the coupling devices 63 to swing in a swing direction that is parallel to the length of the housing 60, as indicated by the double-headed arrow 92 in FIG. 15. More specifically, the swing member 71 includes an elongated base 711 of a generally rectangular cross section and having a top face 715, a front face 716 connected perpendicularly to the top face 715, and a plurality of hollow pillars 712 extending upwardly from the top face 715. Each of the pillars 712 extends through and is connected perpendicularly and pivotally to a corresponding one of the distal ends 634, 635 of the cantilevers 632, 633. Each of the pillars 712 has a primary vertical shaft 73 journalled therein.

Each of the primary vertical shafts 73 has an upper end 731, a lower end 732, a nut member 734 fastened on the upper end 731, an abutting flange 733 spaced apart and disposed below the nut member 734, and a longitudinal rack portion 735 formed adjacent to the lower end 732 thereof. The second end portion 643 of each of the levers 641 is connected universally between the nut member 734 and the abutting flange 733 of a corresponding one of the primary vertical shafts 73. As such, the primary vertical shafts 73 can move upwardly and downwardly together with the second end portions 643 and can turn relative to the same when the swing member 71 moves in the swing direction as indicated by the arrow 92. Each of the pillars 712 has an opening 713 facing the housing 60, a hollow block 72 sleeved thereon and having an inner space 721 communicated with the opening 713, a pinion 74 disposed in the inner space 721 and having teeth that extend into each of the pillars 712 through the opening 713 and that engage the longitudinal rack portion 735 of a corresponding one of the primary vertical shafts 73, two connecting shafts 741 extending oppositely from the pinion 74 through the hollow block 72 and extending transversely of a corresponding one of the pillars 712, and two crank arms 75 connected perpendicularly and respectively to distal ends of the connecting shafts 741 and extending forwardly to the front face 716 of the base 711 on opposite sides of the hollow block 72

Referring to FIG. 15, the front face 716 of the base 711 has a plurality of horizontal shafts 714 extending forwardly therefrom and staggered vertically relative to vertical lines passing through the pillars 712. Each of the workpiece holding devices 8 has a secondary vertical shaft 81 disposed in front of the front face 716 of the base 711 and a corresponding one of the pillars 712 between two crank arms 75 by virtue of amounting frame 811, and connected pivotally to distal ends of the crank arms 75 in order to move upwardly and downwardly when the primary vertical shafts 73 are moved upwardly and downwardly. Each of the workpiece holding devices 8 further has two link rods 82 having upper ends 922 connected pivotally to a lower end 812 of the secondary vertical shaft 81 and lower ends 823, two cross members 83, 84 having intermediate portions 834, 844 connected pivotally and respectively to the lower ends 823 of the link rods 82, two swing ends 832, 842, and two pivot ends 831, 841 that are connected pivotally to two adjacent horizontal shafts 714, and two clamping arms 85, 86 connected respectively to the swing ends 832, 842. As such, when the secondary vertical shafts 81 are moved upwardly and downwardly, the cross members 83, 84 and the clamping arms 85, 86 can turn about the horizontal shafts 714 via the link rods 82. One of the cross members 83 of each of the workpiece holding devices 8 has an adjustment mechanism 87 provided thereon. The adjustment mechanism 87 includes an arm member 871 connected pivotally to one of the link rods 82 at one end thereof, and connected pivotally to the pivot end 831 of one of the cross members 83 at the other end thereof. The arm member 871 has a longitudinal slot 872 formed therein. The cross member 83 has an adjusting block 833 projecting into the longitudinal slot 872 and movable transversely in the longitudinal slot 872. The adjusting block 833 can be positioned in the longitudinal slot 872 by two bolt members 873 in order to adjust the distance between the clamping arm 85 and the associated horizontal shaft 714. In addition, the clamping arm 85 is connected to the cross member 83 by a releasable locking bolt. Therefore, the angle between the clamping arm 85 and the cross member 83 is adjustable A linking plate 9 is connected pivotally to the pillars 712 of the swing member 71 between the distal ends 634, 635 of the upper and lower cantilevers 632, 633, and is elongated in a direction parallel to the swing direction as indicated by the arrow 92. More specifically, the linking plate 9 has a plurality of holes 91 through which the pillars 712 extend. One end of the linking plate 9 is connected to a driving mechanism (not shown) to reciprocate in the swing direction as indicated by the arrow 92, thereby resulting in swinging of the swing member 71 and the coupling mechanisms 63 about the cylindrical members 621.

Figure 16:
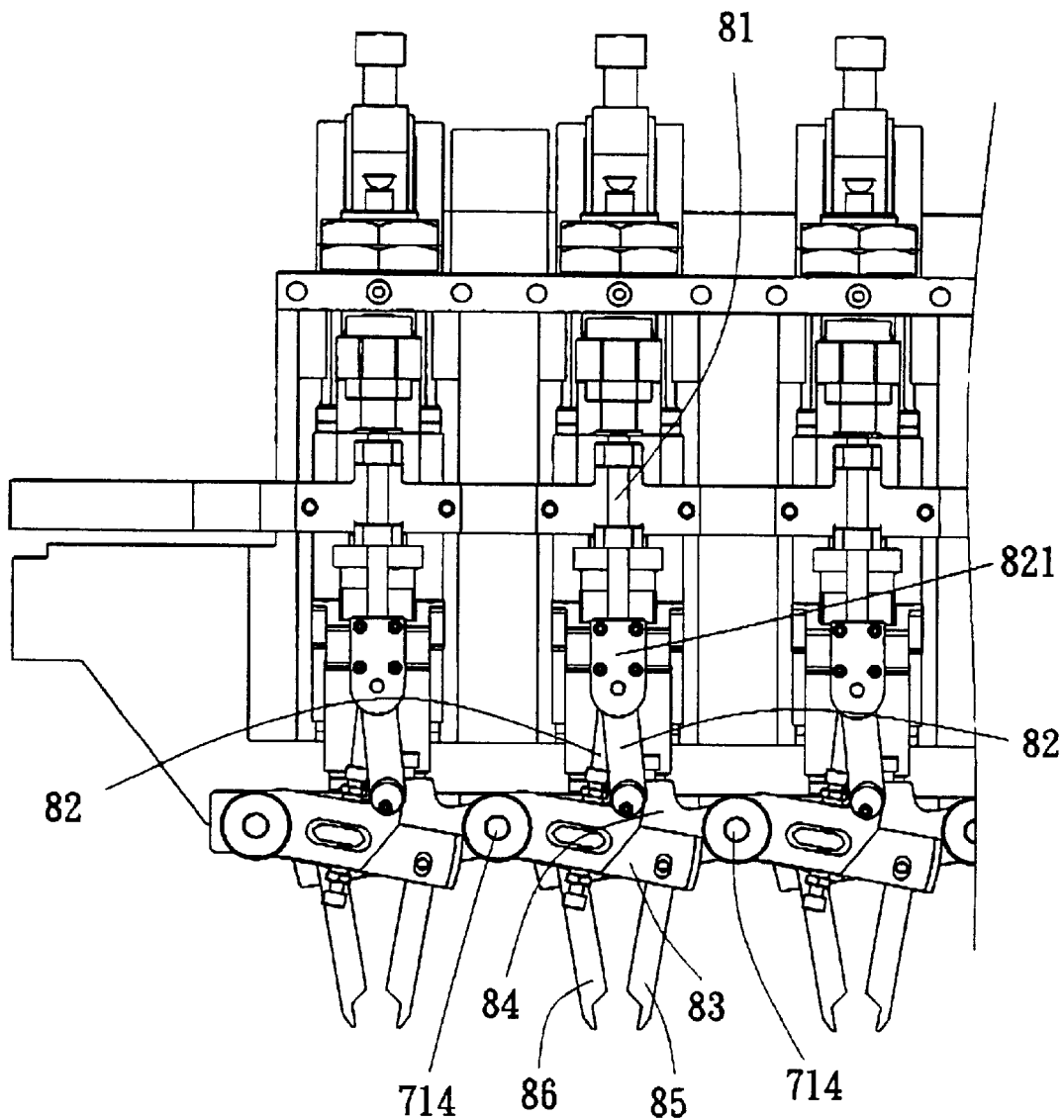
FIG. 16 is a fragmentary front view of the second preferred embodiment of the workpiece transfer device, showing workpiece holding devices of the workpiece transfer device in which clamping arms of the workpiece holding devices are moved toward one another.
Figure 17:
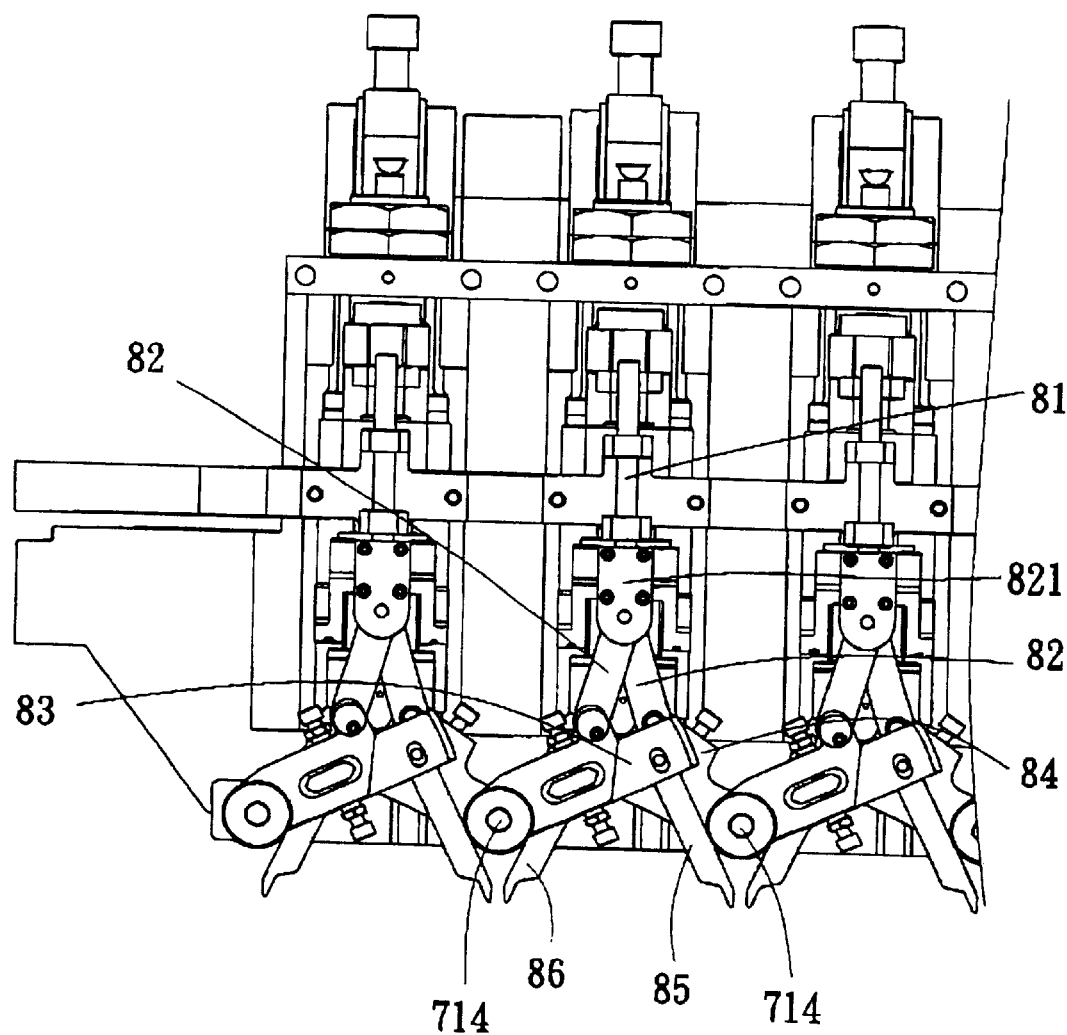
FIG. 17 is a fragmentary front view of the second preferred embodiment of the workpiece transfer device, showing workpiece holding devices of the workpiece transfer device in which the clamping arms of the workpiece holding devices are moved away from one another.

The operation of the workpiece transfer device of the second preferred embodiment is similar to that of the workpiece transfer device of the first preferred embodiment. However, when the second end portions 643 of the levers 641 are driven to move downwardly, the primary vertical shafts 73 are moved downwardly. The downward movement of the primary vertical shafts 73 turn the pinions 74 and the crank arms 75 downwardly. As such, the clamping arms 85, 86 are moved toward one another via the link rods 82 and the cross members 83, 84 in order to clamp a blank section (not shown), as best illustrated in FIG. 16. When the second end portions 643 of the levers 641 are driven to move upwardly, the primary vertical shafts 73 are moved upwardly. The upward movement of the primary vertical shafts 73 turn the pinions 74 and the crank arms 75 upwardly. At this time, the clamping arms 85, 86 are moved away from one another via the link rods 82 and the cross members 83, 84 in order to release the blank section, as best illustrated in FIG. 17.

The advantages of the workpiece transfer device of the present invention are as follows:

1. A plurality of coupling devices are employed to interconnect pivotally the elongated swing member and the elongated housing. When the levers are driven by the cam member or the air cylinders to apply a vertical force to the swing member, the swing member can have an improved rigidity to withstand the vertical force. As such, vibration of the swing member can be effectively prevented. In addition, the linking plate links all of the coupling devices to swing the swing member, thus resulting in further reduction of the vibration of the swing member.

Figure 18:
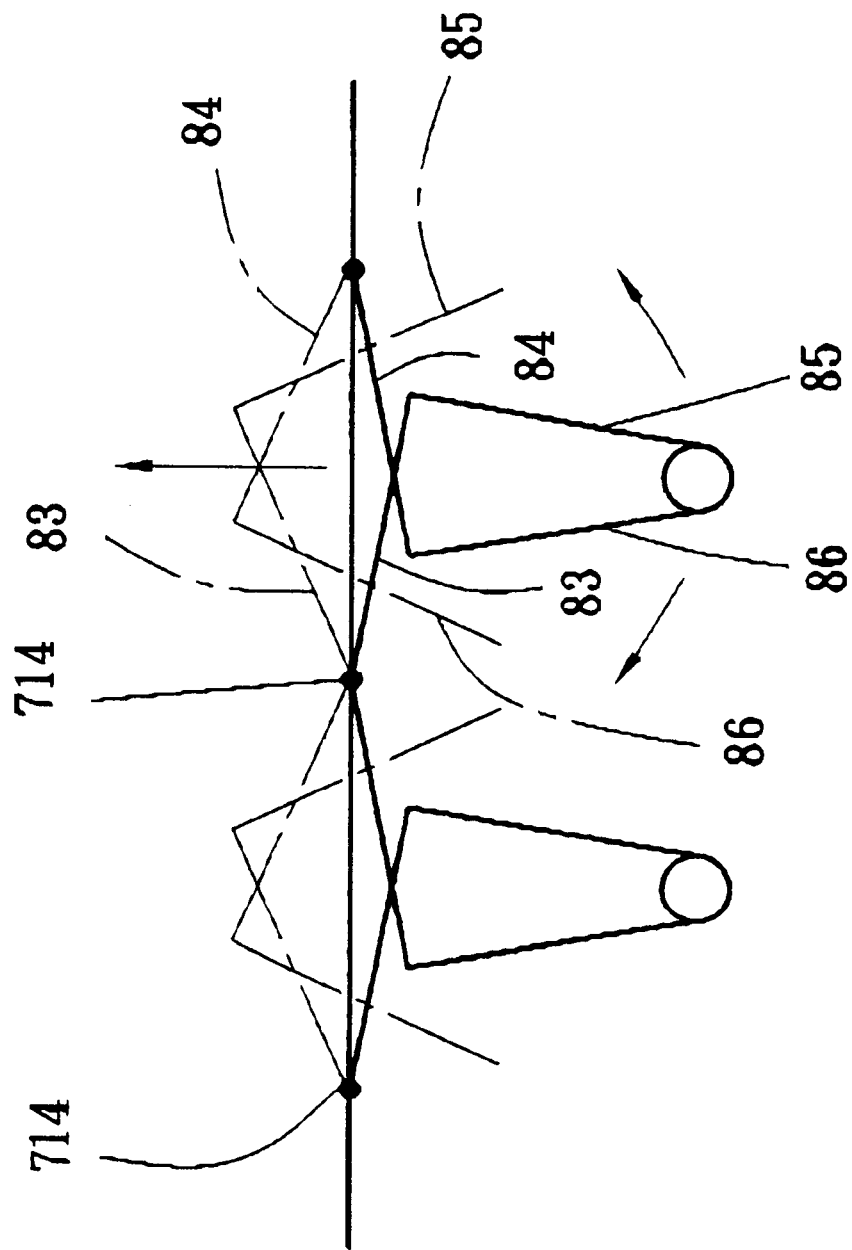
FIG. 18 is a schematic view illustrating the turning angle of the clamping arms of the workpiece holding devices of FIG. 17.

2. Since the air cylinders are disposed outside the housing, a large space is available for installing the air cylinders. As a result, the sizes of the air cylinder can be varied to meet the manufacturing requirements of the forging machine. For example, when the sizes of the air cylinders are increased, the spindles can apply a larger force to the levers in a faster manner. As such, the clamp arms can clamp the blank sections in a more firm and quick manner as compared to the conventional workpiece transfer device. In addition, with reference to FIG. 6, a middle air cylinder 34' may be disposed rearwardly of the housing 20. A push rocker arm 32' extends obliquely to a bottom portion of the air cylinder 34' and is connected to a spindle 33', 3. With reference to FIGS. 16, 17 and 18, the cross members 83, 84 in each of the workpiece holding devices 8 are connected pivotally and respectively to two adjacent horizontal shafts 714. The distance between the swing ends 832, 842 of the cross members 83, 84 is longer than that in the conventional workpiece holding device. Therefore, the clamping arms 85, 86 can move away from one another to form a larger opening angle therebetween. Accordingly, when the punch-moved die members punch the blank sections clamped by the workpiece holding devices 8, the clamping arms 85, 86 open by a large angle to prevent collision between the punch-moved die members and the clamping arms 85, 86. Further, the larger opening angle of the clamping arms 85, 86 permits the clamping arms 85, 86 to move across the punch-moved die members and the blank sections held by the punch-moved die members and the countering die members. As such, the forging machine can be manipulated in a time-saving manner.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A workpiece transfer device, comprising:

an elongated hollow housing having a top side;

a plurality of actuating mechanisms, each having a cam member, and an actuating rocker arm operatively connected to said cam member, said actuating rocker arm of each of said actuating mechanisms having an output end that extends over said top side of said housing and that is movable toward and away from said top side of said housing when said cam member is actuated;

a plurality of push mechanisms having a plurality of spindles disposed inside and spaced longitudinally of said housing and movable vertically relative to said top side of said housing, and a plurality of biasing units for urging said spindles to move upwardly, each of said spindles having an upper end extending through said top side of said housing to abut against said output end of said actuating rocker arm of a corresponding one of said actuating mechanisms by bias action of a corresponding one of said biasing units, each of said spindles being movable downwardly against the biasing action of the corresponding one of said biasing units when said output end of said actuating rocker arm of the corresponding one of said actuating mechanisms moves downwardly;

a plurality of coupling devices, each having a cylindrical sleeve member sleeved rotatably on a corresponding one of said spindles, and at least one cantilever extending radially from said sleeve member for turning about the corresponding one of said spindles, said cantilever of each of said coupling devices having a distal end distal from the corresponding one of said spindles;

a plurality of lever mechanisms, each having a lever connected pivotally to said cantilever of a corresponding one of said coupling devices, said lever of each of said lever mechanisms having a first end portion engaging the corresponding one of said spindles to move upwardly and downwardly therewith, and a second end portion adjacent to said distal end of said cantilever of the corresponding one of said coupling devices; and an elongated swing member connected pivotally to said distal end of said cantilever of each of said coupling devices to swing in a swing direction that is parallel to a length of said housing, said swing member having a plurality of primary vertical shafts extending therethrough and spaced longitudinally thereof, each of said primary vertical shafts having an upper end that is connected universally to said second end portion of said lever of a corresponding one of said lever mechanisms in order to move upwardly and downwardly together with said second end portion of said lever of the corresponding one of said lever mechanisms.

2. The workpiece transfer device as claimed in claim 1, further comprising a plurality of workpiece holding devices connected operatively to said primary vertical shafts for clamping and releasing workpieces when said primary vertical shafts are moved upwardly and downwardly by said lever mechanisms.

3. The workpiece transfer device as claimed in claim 2, wherein each of said biasing units has an air cylinder disposed outside said housing, a piston member disposed in said air cylinder, and a push rocker arm having opposite first and second ends that abut respectively against said piston member and a lower end of the corresponding one of said spindles.

4. The workpiece transfer device as claimed in claim 2, wherein said swing member includes an elongated hollow casing of a generally rectangular cross section and having a top wall, a front wall connected perpendicularly to said top wall, and a plurality of pillars extending upwardly from said top wall, each of said pillars having an axial through hole extending into an interior of said casing, said axial through hole of each of said pillars having a corresponding one of said primary vertical shafts journalled therein, said distal end of each of said cantilevers being connected perpendicularly and pivotally to a corresponding one of pillars, each of said workpiece holding devices having a pair of horizontal shafts extending perpendicularly through and journalled in said front wall of said casing and having inner ends disposed inside said casing and outer ends disposed outside said casing, two gear members fixed respectively adjacent to said inner ends of said horizontal shafts and meshing with one another, two cross members connected respectively and perpendicularly to said outer ends of said horizontal shafts, and two clamping arms connected respectively to said cross members, each of said primary vertical shafts having a lower end connected to one of said gear members on said horizontal shafts of a corresponding one of said workpiece holding devices in order to turn said gear members relative to one another, thereby turning said clamping arms to move toward and away from one another via said horizontal shafts and said cross members.

5. The workpiece transfer device as claimed in claim 4, further comprising a linking plate connected pivotally to said pillars of said swing member and elongated in a direction parallel to said swing direction.

6. The workpiece transfer device as claimed in claim 2, wherein said swing member has an elongated base of a generally rectangular cross section and having a top face, a front face connected perpendicularly to said top face, and a plurality of hollow pillars extending upwardly from said top face, each of said pillars being connected perpendicularly and pivotally to said distal end of a corresponding one of said cantilevers, each of said primary vertical shafts extending into and being journalled in a corresponding one of said pillars.

7. The workpiece transfer device as claimed in claim 6, wherein each of said primary vertical shafts has a lower end and a longitudinal rack portion formed adjacent to said lower end thereof, each of said pillars having an opening facing said housing, a hollow block sleeved thereon and having an inner space communicated with said opening, a pinion disposed in said inner space and having teeth that extend into each of said pillars through said opening and that engage said longitudinal rack portion of a corresponding one of said primary vertical shafts, two connecting shafts extending oppositely from said pinion through said hollow block and extending transversely of a corresponding one of said pillars, and two crank arms connected perpendicularly and respectively to distal ends of said connecting shafts and extending forwardly to said front face of said base on opposite sides of said hollow block.

8. The workpiece transfer device as claimed in claim 7, wherein said front face of said base has a plurality of horizontal shafts extending forwardly therefrom and staggered vertically with respect to the vertical lines passing through said pillars, each of said workpiece holding devices having a secondary vertical shaft disposed in front of said front face of said base and a corresponding one of said pillars, and connected pivotally to distal ends of said crank arms in order to move upwardly and downwardly when said primary vertical shafts are moved upwardly and downwardly, two link rods having upper ends connected pivotally to a lower end of said secondary vertical shaft and lower ends, two cross members having intermediate portions connected pivotally and respectively to said lower ends of said link rods, two swing ends, and two pivot ends that are connected pivotally to two adjacent ones of said horizontal shafts, and two clamping arms connected respectively to said swing ends.

* * * * *